(12) United States Patent
Shukuri et al.

(10) Patent No.: US 6,555,202 B2
(45) Date of Patent: Apr. 29, 2003

(54) TEMPERED GLASS SHEET FOR VEHICLE AND VEHICLE WINDOW

(75) Inventors: Kyoichi Shukuri, Osaka (JP); Kazuo Yamada, Osaka (JP); Takahiro Shimomura, Osaka (JP)

(73) Assignee: Nippon Sheet Glass Co. LTD, Osaka ( * ) Notice: Subject to any disclaimer, the term of this patent is extended or adjusted under 35 U.S.C. 154(b) by 0 days.

(21) Appl. No.: 09/311,810

(22) Filed: May 13, 1999

(65) Prior Publication Data

US 2002/0064626 A1 May 30, 2002

(30) Foreign Application Priority Data

May 15, 1998 (JP) .......................... 10-132944
Oct. 5, 1998 (JP) .......................... 10-282156

(51) Int. Cl.[7] .................. B32B 3/02; B32B 23/02; B32B 7/02
(52) U.S. Cl. ................... 428/156; 428/157; 428/192; 428/213; 428/215
(58) Field of Search ................ 428/156, 172, 428/192, 157, 410, 174, 213, 215, 210; 52/203

(56) References Cited

U.S. PATENT DOCUMENTS

| 4,075,381 A | * | 2/1978 | Furukawa et al. .......... 428/192 |
| 4,546,986 A | * | 10/1985 | Roselli .......................... 52/403 |
| 4,635,420 A | * | 1/1987 | Batky ............................ 52/403 |
| 4,662,925 A | * | 5/1987 | Thimons et al. .............. 65/104 |
| 4,738,482 A | | 4/1988 | Bohn et al. |
| 5,198,304 A | | 3/1993 | Kramling et al. |
| 5,373,672 A | * | 12/1994 | Schulz ......................... 52/235 |
| 5,667,897 A | * | 9/1997 | Hashemi et al. ............ 428/192 |

FOREIGN PATENT DOCUMENTS

| DE | 19733034 A1 | * | 2/1999 |
| JP | 58-45332 | | 9/1956 |
| JP | 63-82814 | | 4/1988 |
| JP | 63-240423 | | 10/1988 |
| JP | 2-68209 | | 5/1990 |
| JP | 3-98115 | | 10/1991 |
| JP | 7-137535 | | 5/1995 |
| JP | 11-59171 | | 3/1999 |

OTHER PUBLICATIONS

European Search Report, Oct. 14, 2001.*

* cited by examiner

*Primary Examiner*—Donald J. Loney
(74) *Attorney, Agent, or Firm*—Merchant & Gould P.C.

(57) ABSTRACT

A tempered glass sheet having a sufficient strength needed for a windowpane and can be utilized for smoothing a surface of the window is provided. A tempered glass sheet of the present invention, produced by tempering a glass sheet, has a stepped portion of reduced thickness relative to the thickness of the glass sheet in at least a part of a peripheral portion of the tempered glass sheet. By the stepped portion, a thin portion and a thick portion are formed. A difference in thickness between the thin portion and the thick portion is 0.5 mm or more, and the thickness of the thin portion is thicker than half the thickness of the thick portion.

15 Claims, 18 Drawing Sheets

TEMPERED GLASS SHEET FOR VEHICLE AND VEHICLE WINDOW

FIELD OF THE INVENTION

This invention relates to a tempered glass sheet for vehicles, especially automobiles. This invention also relates to a window for vehicles, especially automobiles.

BACKGROUND OF THE INVENTION

Recently, in vehicles, especially in automobiles, it is attempted to make the surfaces of windows smoother, that is, to reduce discontinuities between a vehicle body and a glass sheet, to reduce air resistance and wind noise. Smoothing the surfaces is effective in improving the appearance of vehicles. It is hard to fit an installing member as a resin molding into a window in which a windowpane is flush with a window frame without sticking out of the window. For removing a stepped portion formed by a installing member, therefore, resin panels having a worked edge have been proposed.

As shown in FIG. 15, Publication of Unexamined Japanese Patent Application Tokkai No. Sho 63-82814 discloses a resin panel 71 having a stepped edge. A retainer 73 is provided in a thin portion of the stepped edge. A resin molding 72 is fit to cover the top of the retainer 71 and have a flush surface with the resin panel 71. This resin panel 71 is installed into a window frame 75 with the retainer 73 and an adhesive 76.

As shown in FIG. 16, Publication of Unexamined Japanese Utility Model Application Zikko No. Hei 3-98115 discloses a resin panel 81 having a tapered edge. The tapered edge contributes to a smooth surface between the resin panel 81 and a resin molding 82 so that a flush surface of the window can be realized when installing the resin panel 81 into the window frame 85 with an adhesive 86. The tapered edge also makes it easy to form the panel 81 with a protecting film 83 by an injection molding method.

As shown in FIG. 17, Publication of Unexamined Japanese Patent Application Tokkai No. Hei 7-137535 discloses a resin panel 91 having a curved edge. The resin panel 91 is used for a retractable automatic window. The panel 91 can be moved along a guide rail from an opened position to a closed position in FIG. 17. The curved edge of the panel 91 makes the surface of the panel 91 flush with the window frame 95 when the panel 91 fits into a weather strip 92.

However, a resin panel has some problems in use as a windowpane, because the surface of a resin panel is easily damaged and a resin panel cannot keep sufficient transparency. A glass sheet is superior to a resin panel in transparency and surface hardness. On the other hand, a glass sheet may cause a problem in strength when working the edge of the glass sheet without any restriction as described above.

A glass sheet for a vehicle window is usually quenched for tempering since glass is brittle. For quenching, a glass sheet is heated to a temperature around its softening point. A tempered glass sheet produced by quenching has a compressive stress layer at the surface while a tensile stress layer appears in the central portion of the cross section. The presence of the compressive stress layer in the surface gives the tempered glass sheet strength. Therefore, when working the edge of the glass sheet to reduce its thickness, the effect of the partial change in thickness on the stress layers should be considered.

No investigations about the stepped edge in a tempered glass sheet for installing to a body of vehicles have been reported, since it has been thought that working in the edge of a tempered glass sheet should be avoided so as to keep the strength of the tempered glass sheet.

Therefore, in the field of glass windows for vehicles, as shown in FIG. 18, a molding 52 molded by extruding has been proposed to achieve a glass window for vehicles in which a glass sheet 51 is arranged flush with a vehicle body 53. This molding 52 is molded by extruding a resin directly at an edge of the glass sheet by remote control.

In addition, in the glass window for vehicles, as shown in FIG. 18, a ceramic mask 55 often is formed in the peripheral portion of the glass sheet. The ceramic mask 55 is formed so as to cover an attaching member, electrical equipment or the like around the window frame so that the appearance of the vehicle body is better. Generally, the ceramic mask 55 is formed in the following manner. A paste comprising a pigment, a glass frit or the like is printed in a predetermined region on the surface of the glass sheet by silk screen. Then, the glass sheet is heated so that the paste is fired in the predetermined region on the surface.

In the glass window for vehicles shown in FIG. 18, the flush surface is achieved by forming the molding 52 so as to be in contact with only the end face of the glass sheet 51. In this glass window, the ceramic mask 55 is required to be formed in the edge of the peripheral region (peripheral edge) 56 of the glass sheet. This is because the molding 52 fails to cover the vicinity of the peripheral edge of the glass sheet 51. However, it is not easy to print a paste while positioning the ceramic mask so that the end of the region where the ceramic mask is formed matches the peripheral edge of the glass sheet (i.e., to perform so-called just edge print). The paste may drop from the end face of the glass sheet, thus resulting in a defect. In addition, since the silk screen touches the corners of the glass sheet when printing, the life of the screen is shortened.

SUMMARY OF THE INVENTION

With the foregoing in mind, it is a purpose of the present invention to provide a tempered glass sheet for vehicle windows that has a sufficient strength needed for a windowpane and can be utilized for smoothing the surfaces of the window.

To achieve the above purpose, a tempered glass sheet for vehicles of the present invention has a stepped portion at least a part of a peripheral portion of the tempered glass sheet. The tempered glass sheet is produced by tempering a glass sheet, and the stepped portion is formed by reducing thickness relative to the thickness of the glass sheet. The tempered glass sheet has a thin portion and a thick portion formed by the stepped portion. A difference in thickness between the thin portion and the thick portion is 0.5 mm or more, and the thickness of the thin portion is thicker than half the thickness of the thick portion.

Thus, a tempered glass sheet having such a worked peripheral portion as described above is suitable for a vehicle window since the glass sheet has a sufficient strength needed for a windowpane and can be utilized for smoothing the window, that is, reducing discontinuities between the vehicle body and the windowpane.

A window for vehicles of the present invention comprises the tempered glass sheet and a supporting member for attaching the tempered glass sheet to a body of a vehicle. It is preferable that the supporting member is fitted in the stepped portion and the supporting member is substantially flush with the tempered glass sheet.

DETAILED DESCRIPTION OF THE PREFERRED EMBODIMENT

The preferred embodiments of the present invention will be described below with reference to the drawings.

Figure 1:
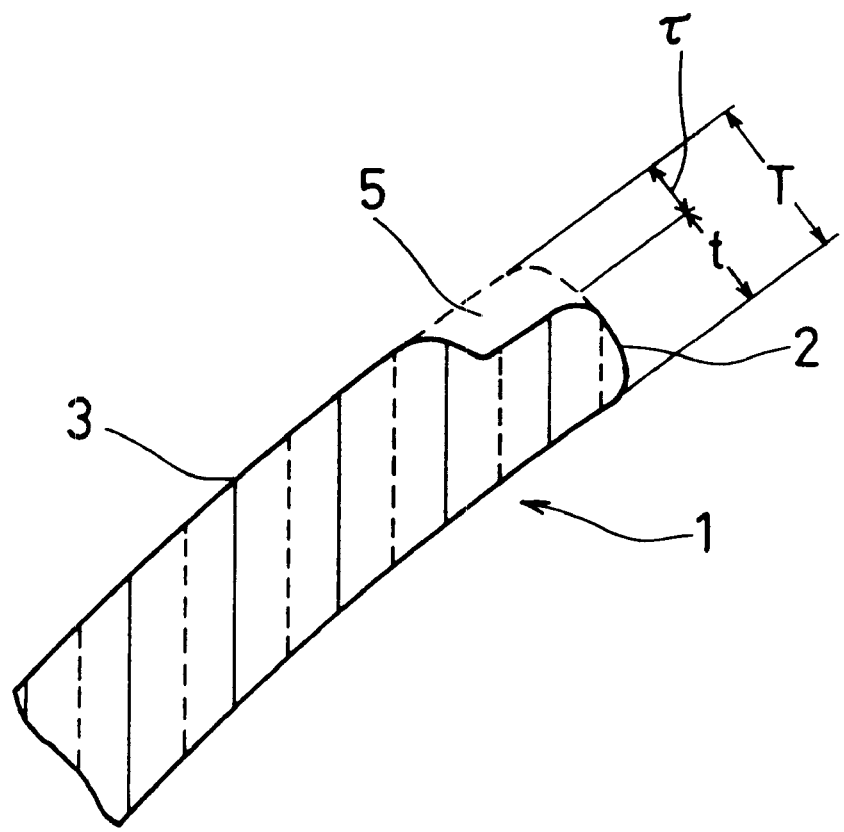
FIG. 1 is a cross-sectional view showing an end portion in an embodiment of a tempered glass sheet for vehicles according to the present invention.

FIG. 1 is a cross-sectional view showing an end portion of a tempered glass sheet for vehicles in an embodiment of the present invention. An end surface 2 of the glass sheet 1 is convex and curved. Such an end surface, called a "round edge", frequently appears in glass sheets for vehicles. The end surface 2 is smooth so as not to include a crack that can be a starting point of a fracture in quenching.

As is illustrated in FIG. 1, one of primary surfaces of the glass sheet is partially ground to form a stepped portion in the end of the glass sheet. In the end portion, the sheet thickness of "T" is reduced to "t" by grinding a thickness of "τ".

Figure 2:
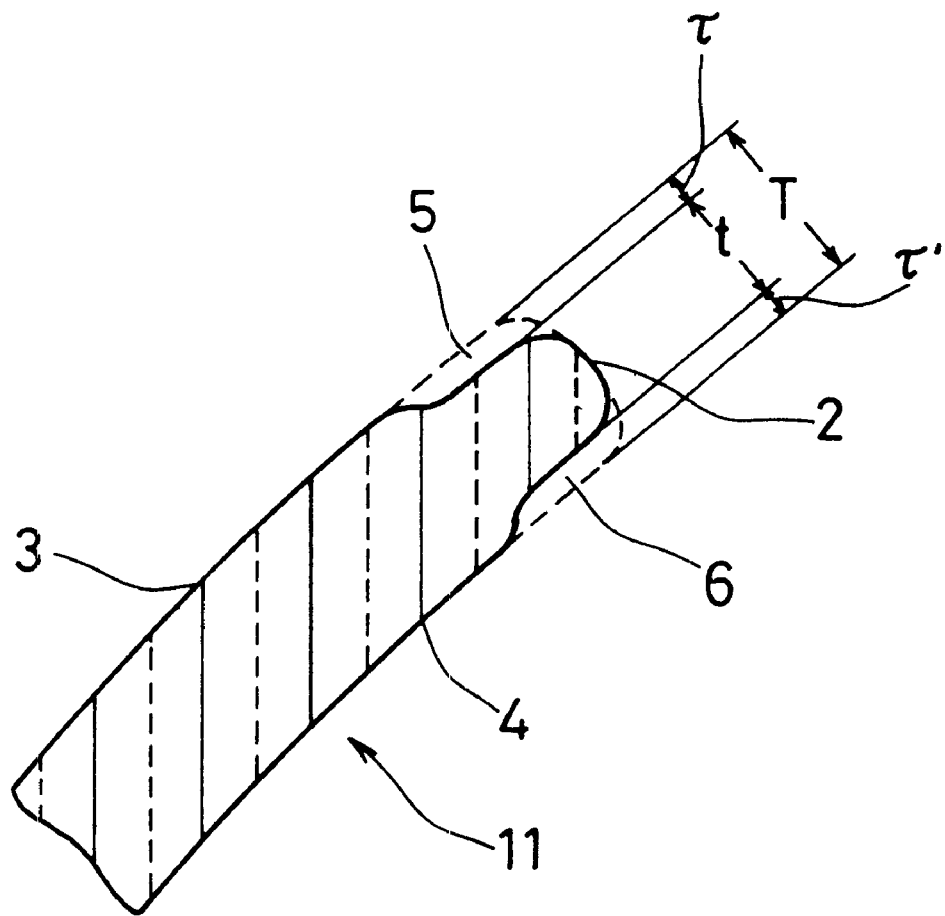
FIG. 2 is a cross-sectional view showing an end portion in another embodiment of a tempered glass sheet for vehicles according to the present invention.

FIG. 2 is a cross-sectional view showing an end portion of a tempered glass sheet for vehicles in another embodiment of the present invention.

The glass sheet 11 is different from the glass sheet 1 in having two stepped portions 5 and 6. As is illustrated in FIG. 2, the glass sheet can have the stepped portion in each primary surface 13 and 14. In the end portion in FIG. 2, the sheet thickness of "T" is reduced to "t" by grinding a thickness of "τ" and "τ'".

In FIGS. 1 and 2, the thickness "T" of the thick portion, the thickness "t" of the thin portion, and ground thicknesses "τ" and "τ'" are preferably determined as the following:

3.5 mm ≦ T ≦ 6.0 mm (1)

t/T > 1/2 (2)

τ ≧ 0.5 mm (3)

τ' ≧ 0 (4)

It is significant in particular to meet the relation (2) so as to keep the strength of the glass sheet. When a tempered glass sheet has an end portion in which t/T is 0.5 or less, the end portion cannot have sufficient strength. The relation (3) determines the height of the stepped portion. The tempered glass sheet of the present invention preferably has a stepped portion of 0.5 mm or more, which is sufficient for smoothing a window of a vehicle.

The stepped portion may include a wider tapered portion between the thin portion and the thick portion than shown in FIGS. 1 and 2.

Figure 3:
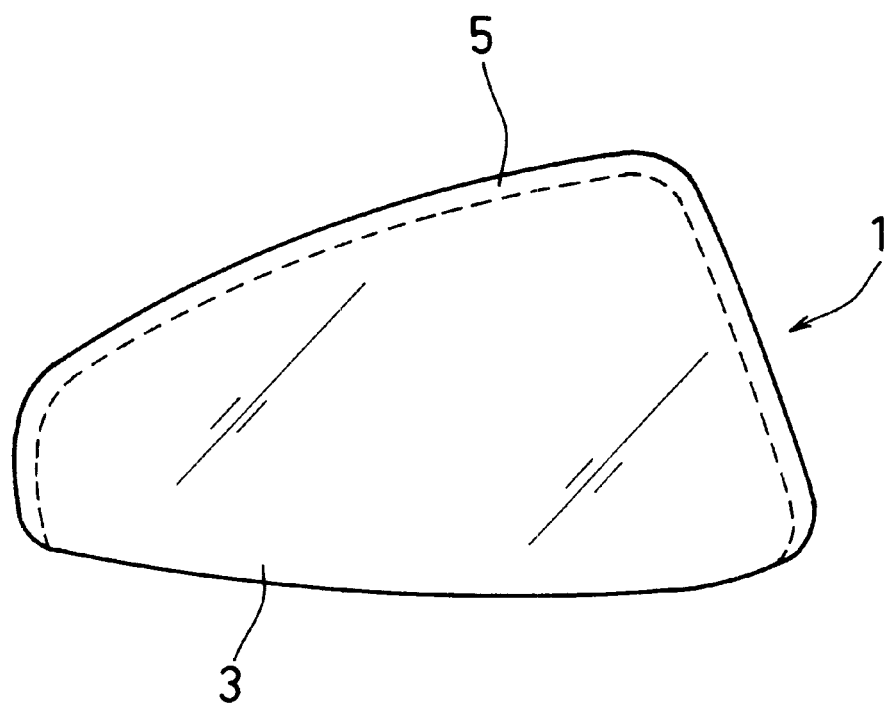
FIG. 3 is a plan view of an embodiment of a tempered glass sheet for vehicles according to the present invention.
Figure 4:
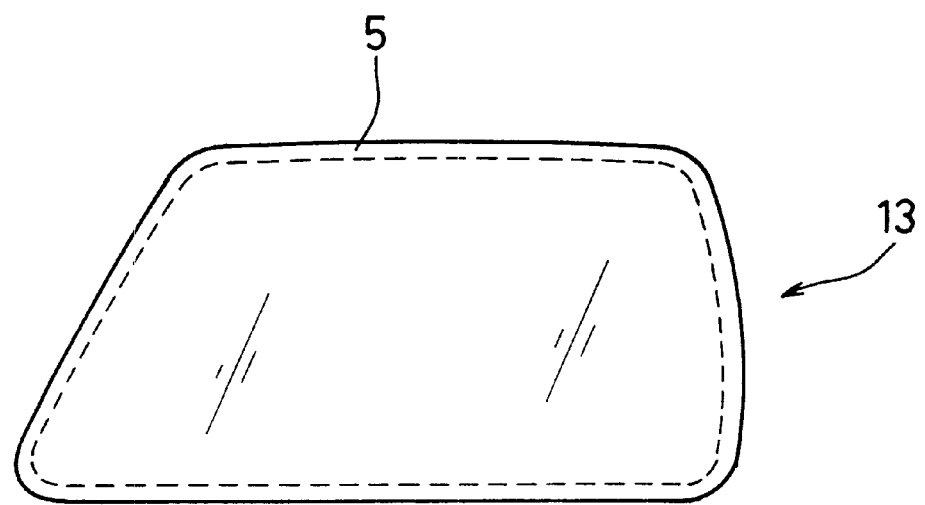
FIG. 4 is a plan view of another embodiment of a tempered glass sheet for vehicles according to the present invention.

FIG. 3 is a plan view of the glass sheet 1 illustrated in FIG. 1. As is illustrated in FIG. 3, it is not necessary to form the stepped portion over the entire peripheral portion of the glass sheet. The stepped portion is formed in at least a part of the peripheral portion of the glass sheet. The glass sheet illustrated in FIG. 3 is used for a retractable side window in a vehicle. The lower end portion of the glass sheet that does not come into contact with a window frame when closing the window does not have a stepped portion. It goes without saying that the tempered glass sheet of the present invention can be used for a fixed window. The tempered glass sheet for a fixed window may have a stepped portion over the entire peripheral portion of the glass sheet 13 as illustrated in FIG. 4.

An embodiment of producing the tempered glass sheet of the present invention will be described below.

Figure 5:
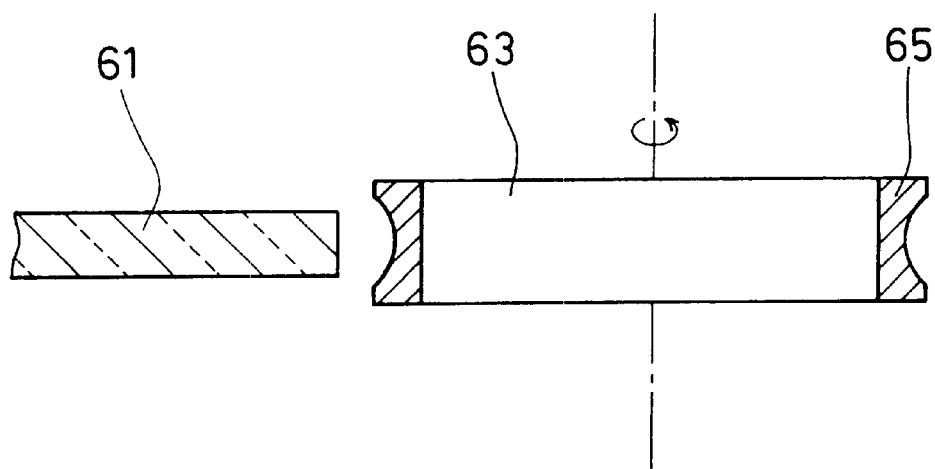
FIG. 5 illustrates an embodiment of the process for grinding an end portion of the glass sheet to be tempered.

First, a float glass is cut into a predetermined shape and ground at the end surface. A grinding wheel 63 as illustrated in FIG. 5 can be used for grinding the edge of the glass sheet. The grinding wheel 63 has a concave grinding member 65 on the end surface. Thus, a convex curved surface of the end of the glass sheet 61 as illustrated in FIGS. 1 and 2 can be realized.

Figure 6:
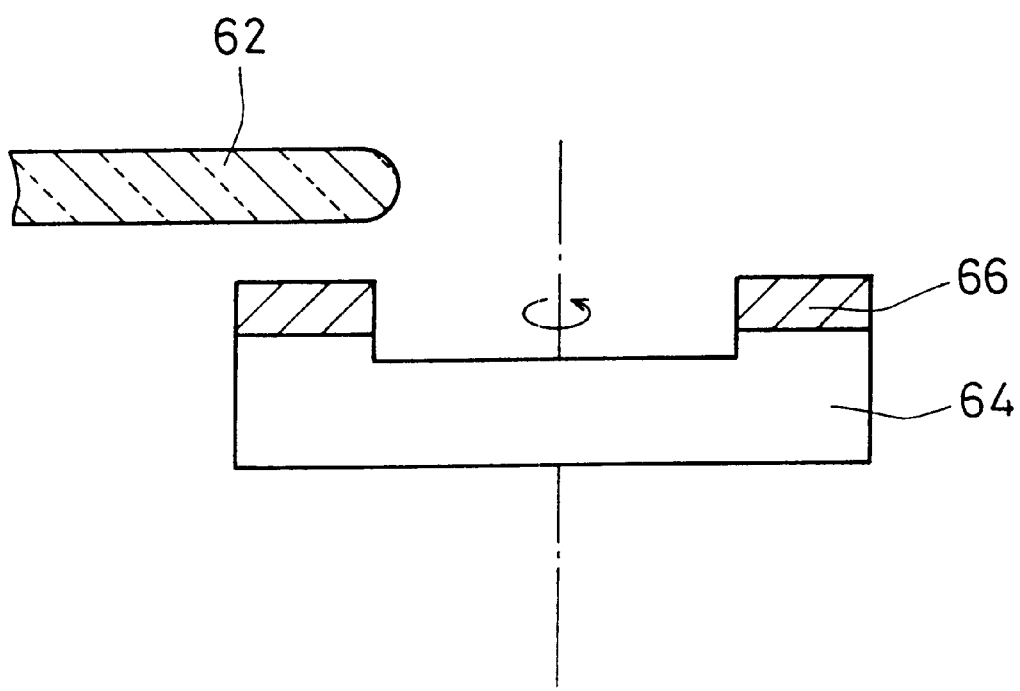
FIG. 6 illustrates an embodiment of the process for grinding a part of a primary surface of the glass sheet to be tempered.

Second, a peripheral portion of the primary surface of the glass sheet 62 that has a curved end surface is ground. A grinding wheel 64 with a grinding member 66 on the circular surface of the wheel as illustrated in FIG. 6 can be used for grinding the primary surface as well as the grinding wheel 63. Thus, a stepped portion as illustrated in FIGS. 1 and 2 can be realized in at least one of the primary surfaces.

The glass sheet can be ground with other grinding means such as a grinding belt.

After forming the stepped portion, the glass sheet is heated to a temperature in which the glass sheet can be changed in shape in many cases. The heated glass sheet is bent along a surface of a mold. Such a bent glass sheet generally is used for a vehicle in view of designing and aerodynamics. The glass sheet is heated to a temperature around a softening point of the glass, e.g. a temperature between a strain point and a softening point. A cooling gas such as air is blown onto the heated glass sheet that has bent as needed. Thus, in the surface of the glass sheet, a compressive stress layer is formed.

By the process as described above, the tempered glass sheet of the present invention can be produced. An installing member such as a molding is fitted around the glass sheet to install the glass sheet into a vehicle window. The installing member preferably fits on the step portion so that the surface of the installing member is flush with the surface of the glass sheet. In the case of a retractable window as seen in an automobile door, a worked edge of the glass sheet can be exposed to air while a weather strip that can accept the edge of the glass sheet preferably is set in the frame. Thus, a window structure having a smooth surface can be realized.

Hereinafter, the vehicle windows of the present invention will be described by way of examples with reference to the accompanying drawings.

Figure 7:
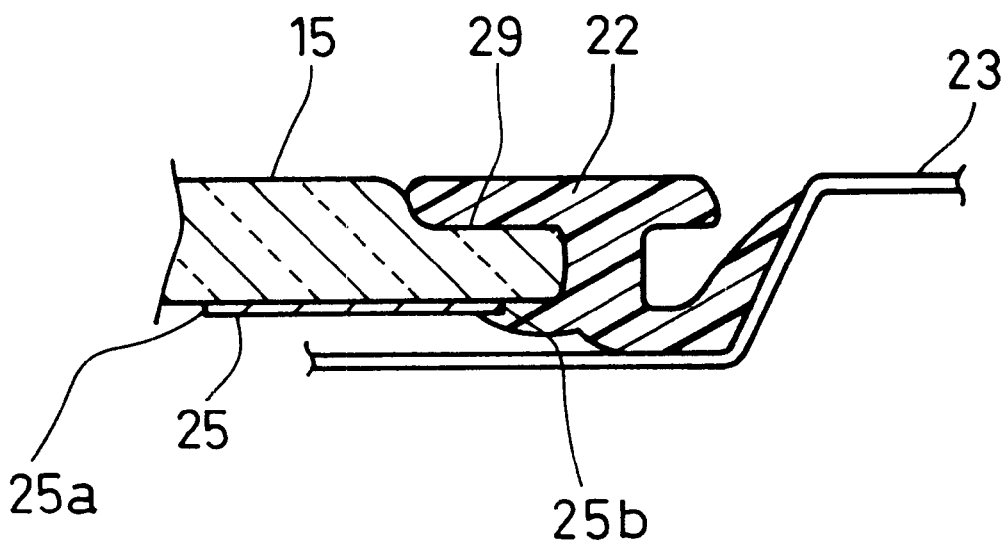
FIG. 7 is a partial cross-sectional view of an embodiment of a window for vehicles of the present invention.

FIG. 7 is a partial cross-sectional view showing an embodiment of a glass window for vehicles of the present invention. A step is provided on the surface outside the vehicle (outer surface) of a glass sheet 15 so that the vicinity of the peripheral edge of the glass sheet is thinned. A molding 22 accepts the thin part 29 and supports the glass sheet 15. As shown in FIG. 7, the glass sheet 15 is arranged flush with the molding 22 on the outer surface. In addition, these members are attached to a window flame 23 of the vehicle so that they are arranged flush with the vehicle body.

A ceramic mask 25 is formed in the peripheral region of an end face of the glass sheet 15 inside the vehicle. The ceramic mask 25 is formed as an opaque layer such as a black layer so that the peripheral region of the glass sheet 15 cannot be seen from the outside. Furthermore, in the vicinity of the peripheral edge of the glass sheet 15, the molding 22 provides the same function of blocking a view. An outer end 25b close to the peripheral edge of the glass sheet in a region where the ceramic mask 25 is formed is in the region that is covered with the molding 22 and thus cannot be seen from the outside. On the other hand, an inner end 25a close to the center of the glass sheet in a region where the ceramic mask 25 is formed is closer to the center of the glass sheet than the end of the molding 22 on the side of the center of the glass sheet. Thus, the ceramic mask 25 covers a part of the thin part 29 and a part of the other thick part of the tempered glass sheet 15.

Figure 8:
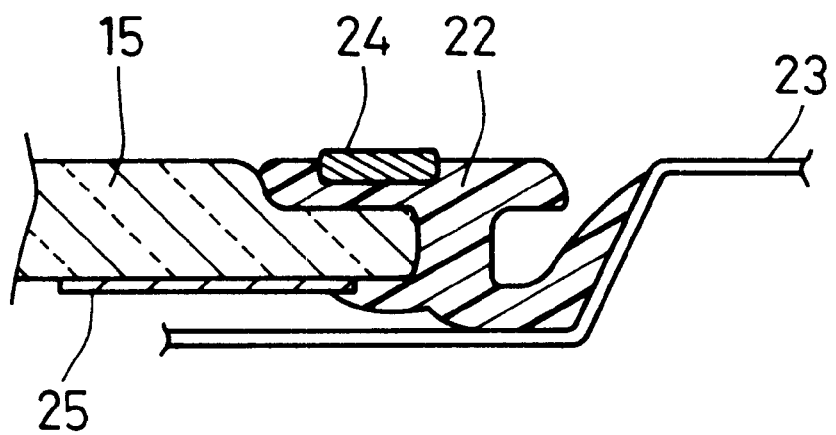
FIG. 8 is a partial cross-sectional view of another embodiment of a window for vehicles of the present invention.

FIG. 8 is a partial cross-sectional view of a glass window for vehicles of the present invention. This glass window for vehicles is different from that shown in FIG. 7 in that an LED 24 is incorporated into the outer surface of the molding 22. The LED 24 can be used as a high mount stop lamp. The member buried in the molding 22 is not limited to the LED, but an EL or other light-emitting member can be used. Furthermore, for the purpose of ornamentation, a reflecting member having an appropriate light-reflectance may be used. Thus, in the glass window for vehicles of the present invention, the molding 22 exposed on the outer surface of the vehicle is wide. Therefore, by utilizing the wide molding 22, a light-emitting member, a light-reflecting member or the like may be arranged on the exposed surface of the molding 22 on the outer surface of the vehicle. These members also preferably are arranged flush with the molding 22, as shown in FIG. 8.

Figure 9:
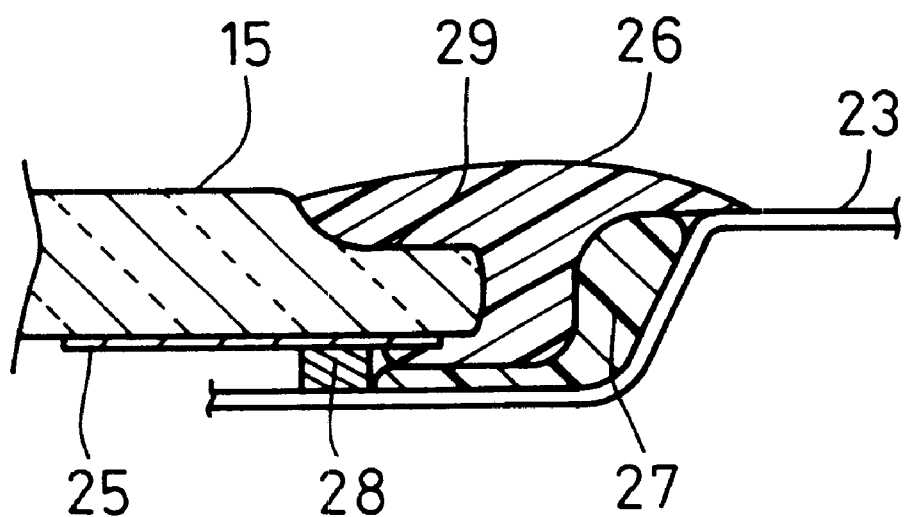
FIG. 9 is a partial cross-sectional view of still another embodiment of a window for vehicles of the present invention.

FIG. 9 is a partial cross-sectional view showing another embodiment of a glass window for vehicles of the present invention. In this glass window for vehicles, a molding 26 is formed by injection molding so as to cover the peripheral edge of the glass sheet. The material of the molding 26 is not limited to particular substances. For example, PVC (polyvinyl chloride) can be used. When the injection molding is utilized, the glass window for vehicles in which the glass sheet and the molding are arranged flush can be produced more efficiently.

In the glass window for vehicles shown in FIG. 9, the shape of the molding 26 may be different from that of the molding 22 shown in FIGS. 7 and 8. An adhesive 27 is filled thick enough to support the glass sheet 15, and a dam member 28 for damming the adhesive 27 is provided. Due to this difference in the shape, the molding 26 protrudes toward the outside of the vehicle slightly more than the molding 22 shown in FIGS. 7 and 8. However, the molding 26 does not protrude toward the outside of the vehicle so much as the conventional molding, although the molding 26 has a sufficient thickness to support the glass sheet 15 as the conventional molding. Thus, the present invention includes all the glass windows for vehicles in which the supporting member such as a molding is arranged substantially flush with the glass sheet by utilizing the stepped portion of the glass sheet while supporting the glass sheet with strength necessary for use.

Figure 10:
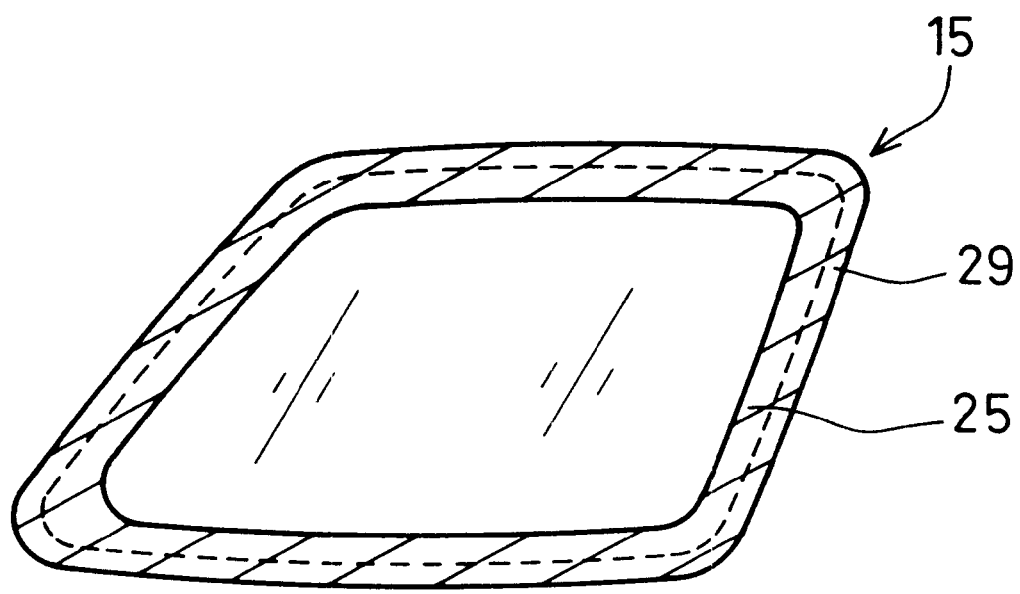
FIG. 10 is a plan view of an embodiment of a tempered glass sheet for vehicles according to the present invention.

FIG. 10 is a plan view of one embodiment of the glass sheet 15 for use in the glass window for vehicles of the present invention. A thin portion 29 with a smaller thickness is formed around the entire periphery of the glass sheet 15. The thin portion 29 is formed in a region having a substantially constant width from the peripheral edge of the glass sheet. Furthermore, the ceramic mask 25 covers the thin portion 29 throughout the periphery of the glass sheet and is formed in a wider region than the thin portion 29. However, although it is preferable to form the ceramic mask 25 for better appearance, this is not essential to the glass window for vehicles of the present invention. The ceramic mask 25 may be formed partially over the peripheral region of the glass sheet.

The step in the peripheral region may be formed over the entire periphery of the glass sheet. Alternatively, the step may be formed partially over the periphery of the glass sheet. When the step is formed partially in the periphery of the glass sheet, gouging processing, notch processing or the like may be performed with respect to a portion where the step is formed in order to increase the peripheral area of the thin part formed by the step. When the peripheral edge of the glass sheet is partially processed in this manner, the attachment strength of the glass sheet can be obtained even if the glass sheet is supported partially.

Figure 11:
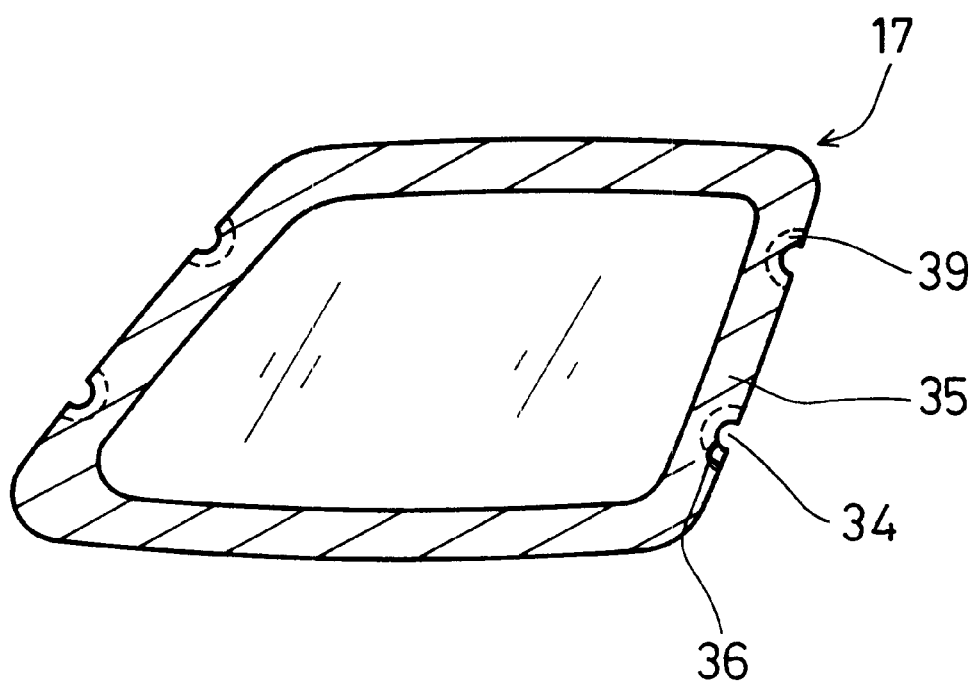
FIG. 11 is a plan view of another embodiment of a tempered glass sheet for vehicles according to the present invention.

In an example shown in FIG. 11, gouging processing for forming an approximate semicircle is performed with respect to several portions at the peripheral edge of a glass sheet 17. A thin portion 39 is formed by forming a step inboard of an edge 34 of the gouged semicircle of the glass sheet.

Figure 12:
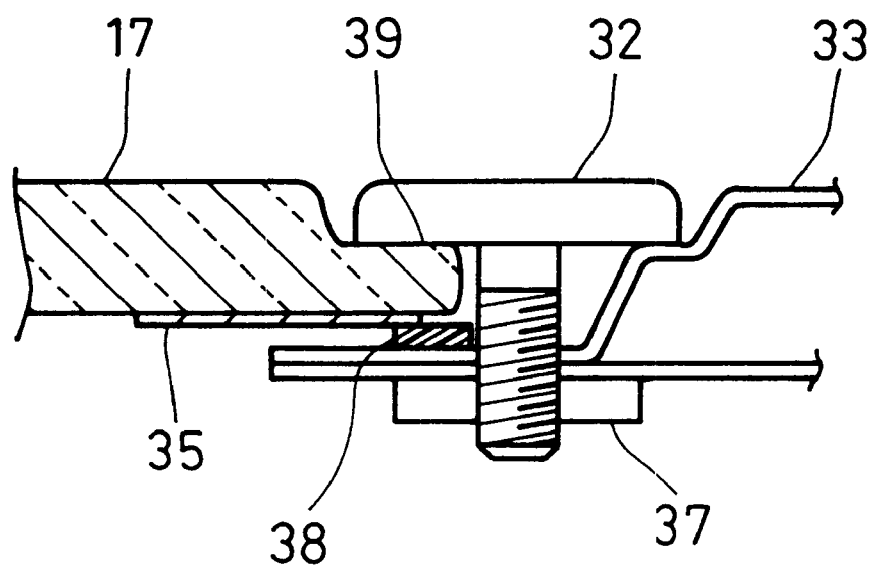
FIG. 12 is a partial cross-sectional view of an embodiment of a glass window for vehicles of the present invention using the tempered glass sheet shown in FIG. 11.

The glass sheet 17 shown in FIG. 11 can be attached to a vehicle body 33, for example, by using a bolt 32, as shown in FIG. 12. In the glass window for vehicles shown in FIG. 12, the bolt 32, which is a supporting member, fixes the thin portion 39 of the glass sheet 17 to the vehicle body 33 in cooperation with a nut 37 and a cushioning material 38. Furthermore, the surface of the bolt 32 is arranged flush with the glass sheet 17 and also flush with the vehicle body 33.

In the glass sheet 17 that has been gouged at the peripheral edge as shown in FIG. 11, the shape of the gouged peripheral edge 34 is not limited to a semicircle and may be other shapes such as a rectangle. However, in order to provide the desired strength of the glass sheet, an angle 36 of the gouged peripheral edge 34 and the glass peripheral edge adjacent to the gouged peripheral edge 34 is preferably 90° or more.

In this case, the ceramic mask 35 may be formed throughout the periphery of the glass sheet (see FIG. 11). Alternatively, the ceramic mask 35 may be formed partially so as to cover only the portion surrounding the gouged portion.

In the glass window that has been described above, the glass sheet is attached to the vehicle body by being supported by the molding or the bolt. However, the supporting member of the glass window for vehicles of the present invention is not limited thereto. For example, as shown in FIG. 13, a U-shaped metal fitting 42 fitted to an edge of the glass sheet 19 may be used as the supporting member.

Figure 13:
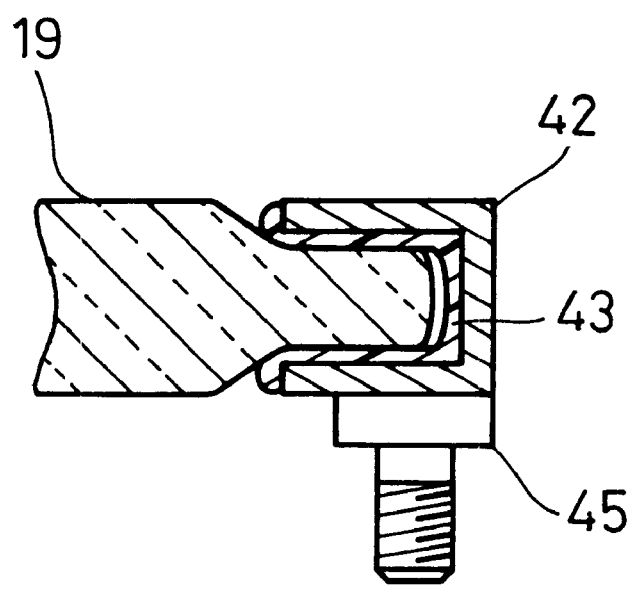
FIG. 13 is a partial cross-sectional view of a glass sheet including a metal fitting as a supporting member.

In the example shown in FIG. 13, a resin layer 43 is provided inside the U-shaped metal fitting 42 so that the shock conveyed to the glass sheet 19 can be alleviated. The glass sheet with such a metal fitting is attached to a vehicle body (not shown), for example, with a bolt 45 attached to a side of the metal fitting 42, as shown in FIG. 13.

As described above, in the glass window for vehicles of the present invention, the glass sheet and the molding are arranged flush on the outer surface of the window of the vehicle. More preferably, the glass sheet, the molding and the vehicle body are arranged flush on the outer surface of the window.

The window for vehicles of the present invention can be suitably used for a glass window for automobiles, but is not limited thereto. The present invention can applied to a glass window for various vehicles. Furthermore, it is not necessary to use the flush surface of the glass sheet as the outer surface of the vehicle. For example, when the flush surface according to the present invention is used as the inner surface of a door glass window of a railway car, there may be less danger that a finger of a passenger placed in the door might go with the door when the door slides into the housing for the door.

Various supporting members used in the glass window for vehicles of the present invention can be formed of materials that have been used conventionally. For example, the molding can be formed of various soft synthetic resin materials. The ceramic mask can be formed by printing a paste comprising a pigment that has been used for the glass sheet for vehicles by silk screen, and heating the paste so as to fire it on the glass sheet. The peripheral portion of the glass sheet can be processed by mechanical grinding using a cylindrical wheel, a coupling wheel or the like. Generally, a soda-lime glass sheet, which is colored if necessary, can be used as the glass sheet.

The shape of the glass sheet is not limited to the embodiments as described above. For example, the edge of the glass sheet can have other shapes other than the round edge. A silver paste, a ceramic paste or the like can be printed on the primary surface of the glass sheet. The glass sheet can be used for any vehicle window such as a side window, a roof window, a back window or a windshield in an automobile.

EXAMPLE

The present invention will be explained in further detail below.

Tempered glass sheets having edges as illustrated in FIG. 1 were produced by the same process as described above so that the edges had various values of t/T. The glass sheets were made of green tinted soda-lime silicate glass and had a thickness of 3.5 mm, 5 mm or 6 mm. A bending test was carried out to investigate the relation between a ratio of t/T in the edge and bending strength of the edge.

Figure 14:
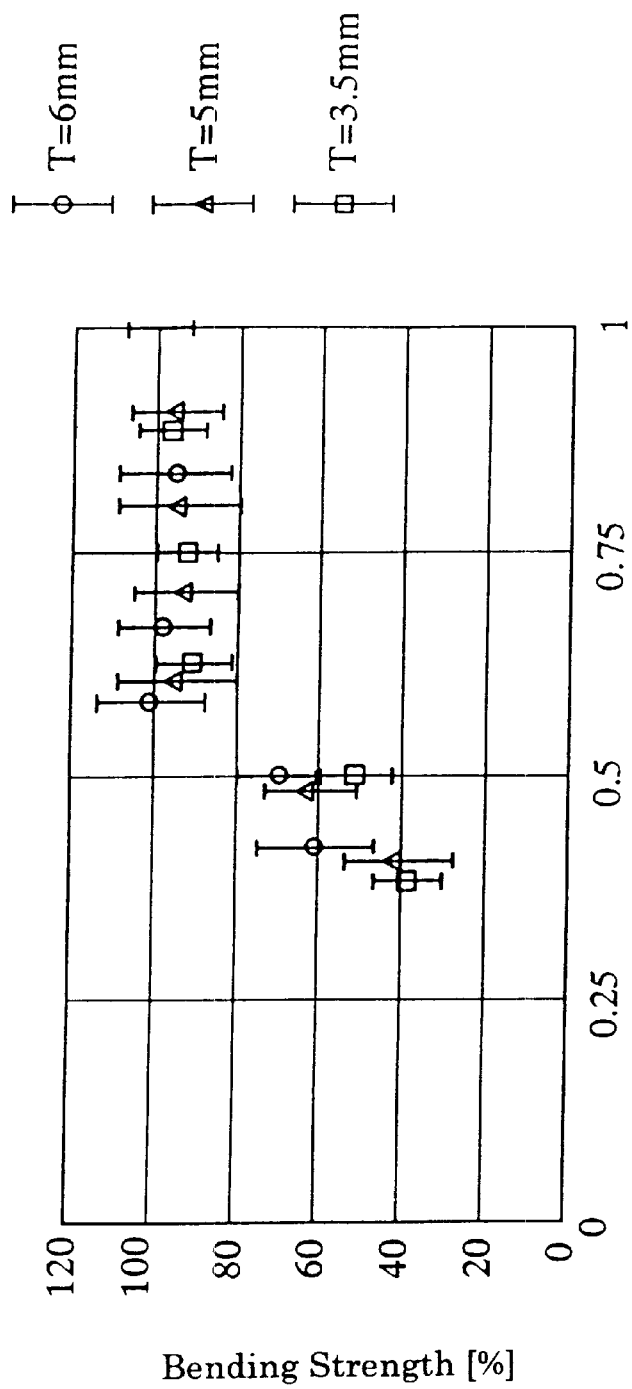
FIG. 14 shows a relation between the ratio of t/T in a stepped portion of a tempered glass sheet and the bending strength of the glass sheet.
Figure 15:
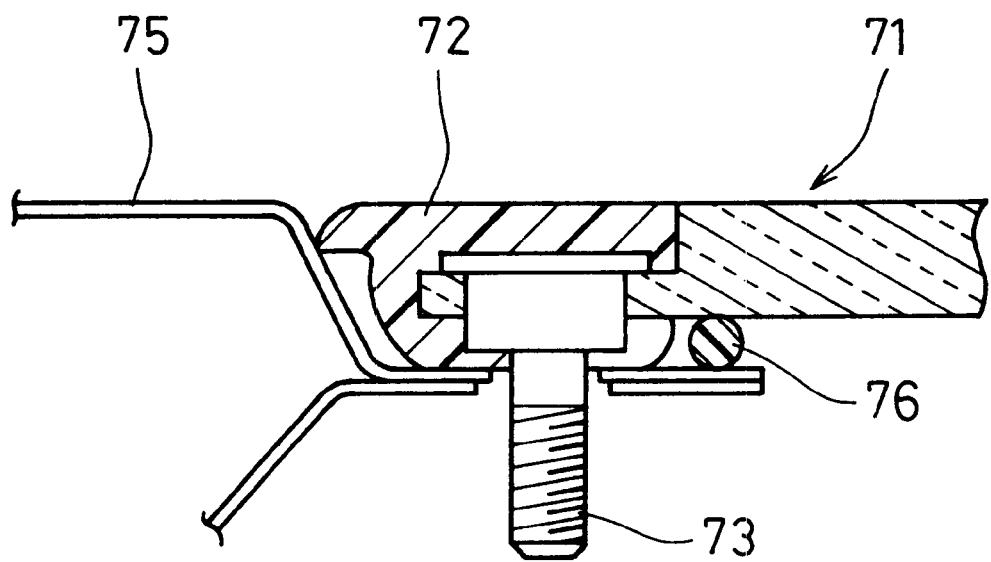
FIG. 15 is a cross-sectional view showing an embodiment of a conventional vehicle window including a resin panel as a windowpane.
Figure 16:
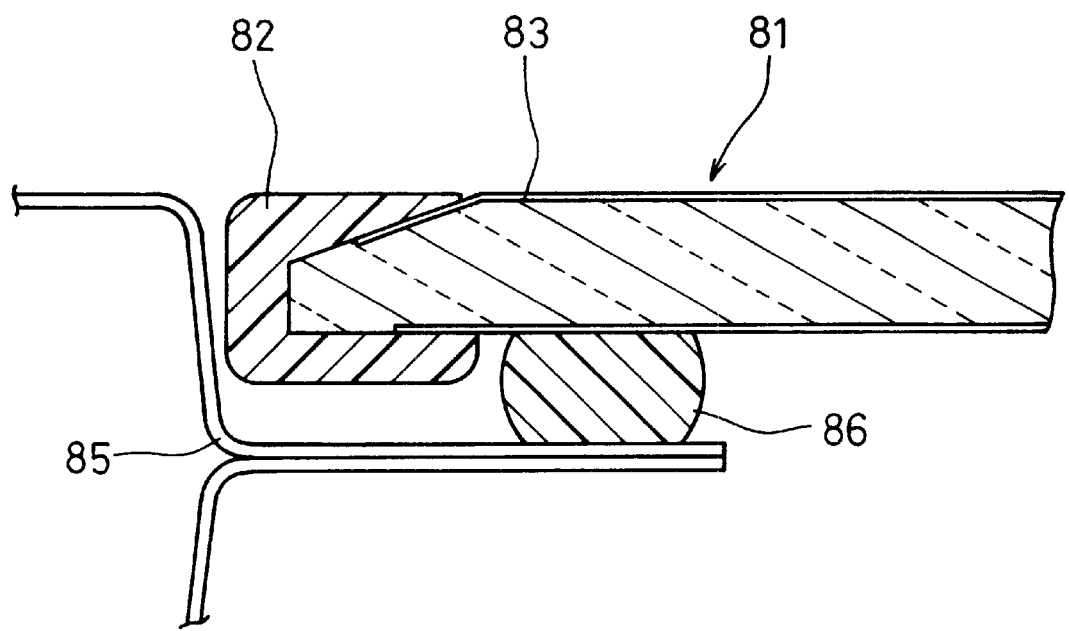
FIG. 16 is a cross-sectional view showing another embodiment of a conventional vehicle window including a resin panel as a windowpane.
Figure 17:
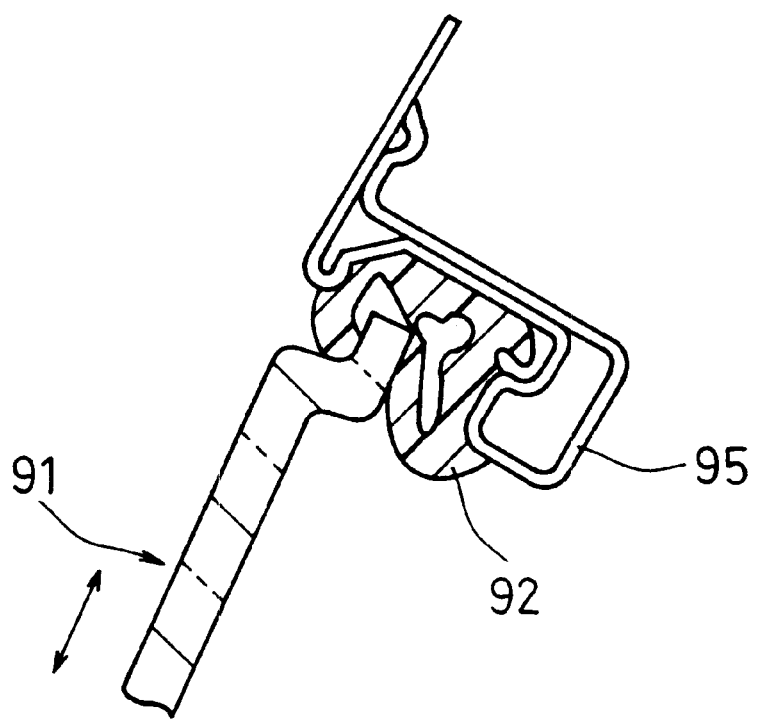
FIG. 17 is a cross-sectional view showing still another embodiment of a conventional vehicle window including a resin panel as a windowpane.
Figure 18:
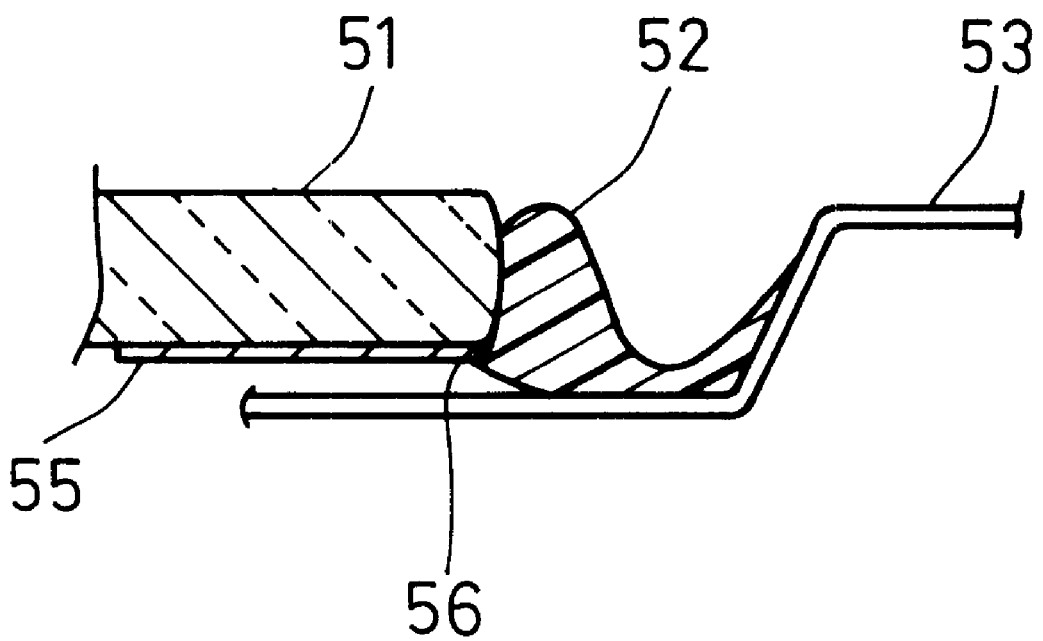
FIG. 18 is a cross-sectional view showing a conventional glass window for vehicles having a flush surface.

FIG. 14 is a graph showing the relative strength of the glass sheets with respect to those of non-worked glass sheets (t/T=1). The bending strength of the glass sheet has the same tendency, regardless of the thickness of the glass sheet (T). The strength of the glass sheets decreases sharply when t/T is 0.5 or less (t/T≦½). On the other hand, the glass sheets have about the same strength as the non-worked glass sheet. When t/T is more 0.5 (t/T>½), the strength of the glass sheets having worked edges is at least 80% of the average strength in the case of t/T =1.

In case of fracturing, a tempered glass sheet can provide smaller and blunt pieces than a non-tempered (normal) glass sheet, which is important in view of physical safety when accidents happen. Therefore, a fracturing test as carried out on the glass sheets produced by the same process as described above. The fracturing test was carried out according to JIS (Japanese Industrial Standards) R 3212.

TABLE 1

| t/T t/T | 3.5 mm | | 5 mm | | 6 mm | |
|---|---|---|---|---|---|---|
| | Primary Surface | Stepped Edge | Primary Surface | Stepped Edge | Primary Surface | Stepped Edge |
| 0.4 | A | C | A | C | A | C |
| 0.5 | A | B | A | B | A | C |
| 0.6 | A | A | A | A | A | A |
| 0.7 | A | A | A | A | A | A |
| 0.8 | A | A | A | A | A | A |
| 0.9 | — | — | A | A | A | A |
| 1.0 | A | — | A | — | A | — |

In Table 1, a valuation basis is as follows: In Primary Surface (the area not including the stepped portion)
  A: The evaluation basis disclosed in the JIS is satisfied.
  B: The evaluation basis disclosed in the JIS is not satisfied. In Stepped Edge (the area including the stepped portion)
  A: There are no long pieces having a long axis of 30 mm or more.
  B: There are less ten long pieces having a long axis of 30 mm or more.
  C: There are ten or more long pieces having a long axis of 30 mm or more.

As shown in Table 1, when t/T is more 0.5 (t/T>½), pieces of glass are sufficiently small even in the edge including a stepped portion.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A tempered glass sheet for a vehicle formed by tempering a glass sheet, comprising a stepped portion of reduced thickness relative to the thickness of the glass sheet in at least a part of a peripheral portion of the tempered glass sheet, and a thin portion and a thick portion formed by the stepped portion, wherein a difference in thickness between the thin portion and the thick portion is 0.5 mm or more, and the thickness of the thin portion is thicker than half the thickness of the thick portion, wherein the tempered glass sheet is a single glass sheet and has a convex curved end surface at the stepped portion.

2. The tempered glass sheet according to claim 1, wherein the thickness of the tempered glass sheet is between 3.5 mm and 6.0 mm.

3. The tempered glass sheet according to claim 1, further comprising a ceramic mask at the peripheral portion, wherein the ceramic mask covers at least a part of the thin portion and at least a part of the thick portion.

4. The tempered glass sheet according to claim 1, wherein the stepped portion is formed on only one of the main surfaces of the tempered glass sheet.

5. The tempered glass sheet according to claim 4, further comprising a ceramics mask, wherein the ceramics mask is formed on the other of the main surfaces so as to cover at least a part of the thick portion and at least a part of the thin portion.

6. A window for vehicles comprising a tempered glass sheet formed by tempering a glass sheet and a supporting member for attaching the tempered glass sheet to a body of the vehicles, the tempered glass sheet comprising a stepped portion of reduced thickness relative to the thickness of the glass sheet in at least a part of a peripheral portion of the tempered glass sheet, and a thin portion and a thick portion formed by the stepped portion, wherein a difference in thickness between the thin portion and the thick portion is 0.5 mm or more, and the thickness of the thin portion is thicker than half the thickness of the thick portion, wherein the tempered glass sheet is a single glass sheet and has a convex curved end surface at the stepped portion.

7. The window according to claim 6, wherein the thickness of the glass sheet is between 3.5 mm and 6.0 mm.

8. The window according to claim 6, the tempered glass sheet further comprising a ceramics mask, wherein the ceramics mask covers at least a part of the thick portion and at least a part of the thin portion.

9. The window according to claim 6, wherein the stepped portion is formed on only one of the main surfaces of the tempered glass sheet.

10. The window according to claim 9, the tempered glass sheet further comprising a ceramics mask, wherein the ceramics mask is formed on the other of the main surfaces so as to cover at least a part of the thick portion and at least a part of the thin portion.

11. The window according to claim 6, wherein the supporting member is fitted on the stepped portion, whereby the supporting member is substantially flush with the tempered glass sheet.

12. The tempered glass sheet according to claim 1, wherein the tempered glass sheet is a bent tempered glass sheet.

13. The window according to claim 6, wherein the tempered glass sheet is a bent tempered glass sheet.

14. The tempered glass sheet according to claim 1, wherein the stepped portion of the tempered glass sheet including a bending strength that is at least 80% of an average strength where t/T=1, t representing the thickness of the thin portion and T representing the thickness of the thick portion.

15. The window according to claim 6, wherein the stepped portion of the tempered glass sheet including a bending strength that is at least 80% of an average strength where t/T=1, t representing the thickness of the thin portion and T representing the thickness of the thick portion.

* * * * *